United States Patent
Soryal et al.

(10) Patent No.: US 11,656,619 B2
(45) Date of Patent: *May 23, 2023

(54) AUTONOMOUS VEHICLE SENSOR SECURITY SYSTEM

(71) Applicant: AT&T Intellectual Property I, L.P., Atlanta, GA (US)

(72) Inventors: Joseph Soryal, Ridgewood, NY (US); Dylan C. Reid, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/178,471

(22) Filed: Feb. 18, 2021

(65) Prior Publication Data
US 2021/0200207 A1 Jul. 1, 2021

Related U.S. Application Data

(63) Continuation of application No. 16/235,001, filed on Dec. 28, 2018, now Pat. No. 10,955,841.

(51) Int. Cl.
*G05D 1/00* (2006.01)
*G05D 1/02* (2020.01)
(Continued)

(52) U.S. Cl.
CPC ......... *G05D 1/0077* (2013.01); *G05D 1/0214* (2013.01); *G06F 16/29* (2019.01);
(Continued)

(58) Field of Classification Search
CPC .. G05D 1/0077; G05D 1/0214; G05D 1/0231; G05D 1/0257; G05D 2201/0213;
(Continued)

(56) References Cited

U.S. PATENT DOCUMENTS 8,706,693 B2 4/2014 Miyazaki et al.
8,973,129 B2 3/2015 van den Berg et al.
(Continued)

FOREIGN PATENT DOCUMENTS

WO 2017046805 A1 3/2017

OTHER PUBLICATIONS

Non-Final Office Action received for U.S. Appl. No. 16/235,001 dated Jul. 20, 2020, 42 pages.
(Continued)

*Primary Examiner* — Tyler J Lee
*Assistant Examiner* — Yufeng Zhang
(74) *Attorney, Agent, or Firm* — Amin, Turocy & Watson, LLP

(57) ABSTRACT

Example methods and systems are disclosed to provide autonomous vehicle sensor security. An example method may include generating, by a first autonomous vehicle, a first map instance of a physical environment using first environmental information generated by a first sensor of a first autonomous vehicle. A second map instance from at least one of a second autonomous vehicle located in the physical environment is received. The first map instance may be correlated with the second map instance. In response to a discrepancy between the first map instance and the second map instance, a secure sensor may be activated to generate a third map instance. In response to the third map instance verifying that the discrepancy accurately describes the physical environment, the first environmental information including the discrepancy is used to navigate the first autonomous vehicle.

20 Claims, 8 Drawing Sheets

(51) Int. Cl.
    *G06F 16/29* (2019.01)
    *H04L 9/40* (2022.01)

(52) U.S. Cl.
    CPC ...... *H04L 63/0823* (2013.01); *H04L 63/0884* (2013.01); *H04L 63/1416* (2013.01); *H04L 63/166* (2013.01); *G05D 1/0231* (2013.01); *G05D 1/0257* (2013.01); *G05D 2201/0213* (2013.01)

(58) Field of Classification Search
    CPC . G06F 16/29; H04L 63/0823; H04L 63/0884; H04L 63/1416; H04L 63/166
    See application file for complete search history.

(56) References Cited

U.S. PATENT DOCUMENTS

| | | | |
|---|---|---|---|
| 9,525,700 | B1 | 12/2016 | Malinowski et al. |
| 9,560,071 | B2 | 1/2017 | Ruvio et al. |
| 9,616,828 | B2 | 4/2017 | Ben Noon et al. |
| 9,689,686 | B1 | 6/2017 | Carmack et al. |
| 9,729,566 | B2 | 8/2017 | Van den Berg et al. |
| 9,834,223 | B2 | 12/2017 | Jammoussi et al. |
| 9,847,033 | B1 | 12/2017 | Carmack et al. |
| 10,005,427 | B2 | 6/2018 | Ur et al. |
| 10,051,411 | B2 | 8/2018 | Breed |
| 2016/0362001 | A1 | 12/2016 | Jung et al. |
| 2017/0013005 | A1 | 1/2017 | Galula et al. |
| 2017/0032671 | A1 | 2/2017 | Toyama et al. |
| 2017/0123428 | A1 | 5/2017 | Levinson et al. |
| 2017/0149820 | A1 | 5/2017 | Ruvio et al. |
| 2017/0272450 | A1 | 9/2017 | Krishnamurthi et al. |
| 2017/0278323 | A1 | 9/2017 | Gupta et al. |
| 2018/0032086 | A1 | 2/2018 | Punithan et al. |
| 2018/0356236 | A1 | 12/2018 | Lawrenson et al. |
| 2019/0129435 | A1 | 5/2019 | Madsen et al. |
| 2020/0098135 | A1 | 3/2020 | Ganjineh et al. |
| 2020/0186355 | A1 | 6/2020 | Devies |

OTHER PUBLICATIONS

Notice of Allowance received for U.S. Appl. No. 16/235,001 dated Nov. 19, 2020, 41 pages.

AUTONOMOUS VEHICLE SENSOR SECURITY SYSTEM

RELATED APPLICATION

The subject patent application is a continuation of, and claims priority to, U.S. patent application Ser. No. 16/235,001 (now issued as U.S. Pat. No. 10,955,841), filed Dec. 28, 2018, and entitled "AUTONOMOUS VEHICLE SENSOR SECURITY SYSTEM," the entirety of which application is hereby incorporated by reference herein.

TECHNICAL FIELD

This disclosure relates generally to autonomous vehicles and, more particularly, to an autonomous vehicle sensor security system for identifying malicious sensor feeds provided to sensors of autonomous vehicles.

BACKGROUND

Autonomous vehicles including fully-autonomous and semi-autonomous vehicles, such as unmanned aerial vehicles (UAVs), ground vehicles, such as, cars, trucks, buses, and motorcycles, and watercraft, such as, boats and submersibles, as well as wearable navigators, may rely on sensors that capture information about the surrounding environment that the autonomous vehicle is traversing. The autonomous vehicle may use the sensor information to perform maneuvers or otherwise navigate autonomously. Obtaining sensor information that accurately describes the surrounding environment is important for the safety of people and property within the autonomous vehicle and in the surrounding environment. Inaccurate sensor information may affect the decision-making process of the autonomous vehicle that results in unwanted or unsafe actions such as sudden stopping, changes in direction, exceeding speed limits, slowing traffic, and the like.

Figure 1:
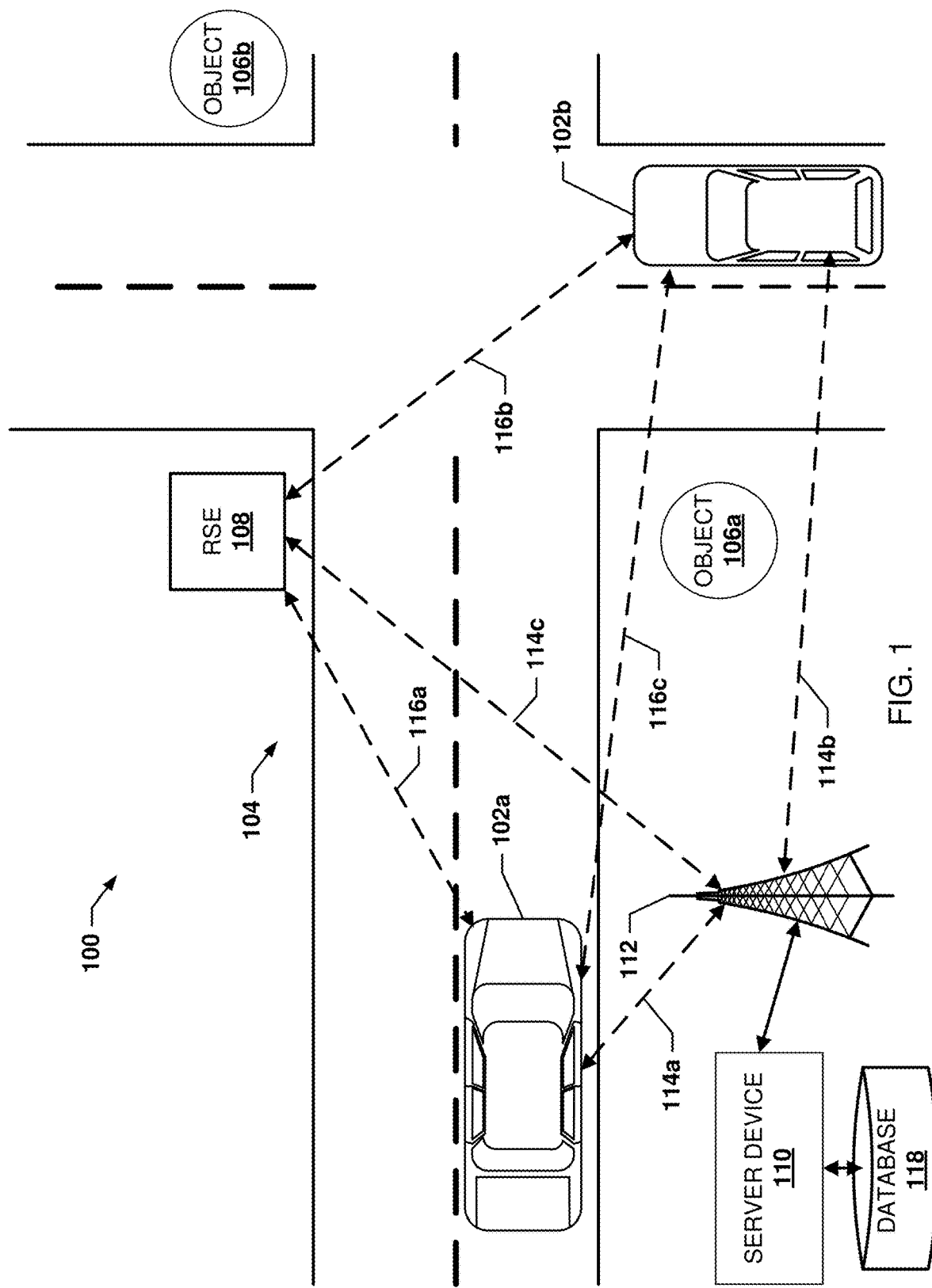
FIG. 1 is a schematic view illustrating an embodiment of an autonomous vehicle sensor security system.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

Embodiments of the present disclosure describe systems and methods that provide for an autonomous vehicle sensor security system. The autonomous vehicle sensor security system includes autonomous vehicles that generate map instances of environmental information that is obtained by a sensor system and exchange those map instances securely between each other to determine whether discrepancies exist in a physical environment. If a discrepancy does exist, such as one caused by a malicious signal that spoofs an object or movement of an object within the physical environment, the autonomous vehicle may deploy a secure sensor that is different than the sensor that obtained the environmental information that included the discrepancy and/or that is only powered on when a discrepancy exists as to minimize the effects of the malicious signal within the physical environment. A secure map instance generated from environmental information obtained by the secure sensor may be correlated with the generated map instance to confirm or deny the discrepancy. Based on the confirmation or the denial of the discrepancy the autonomous vehicle may navigate the physical environment accordingly.

In some embodiments in accordance with the present disclosure, a method of autonomous vehicle sensor security is disclosed. During the method a first map instance of a physical environment using first environmental information generated by a first sensor of a first autonomous vehicle is generated. A second map instance is received from at least one of a second autonomous vehicle or a physical environment monitoring unit located in the physical environment. The second map instance includes second environmental information. The first map instance is correlated with the second map instance based on a first time stamp in the first environmental information and a second time stamp in the second environmental information. In response to a discrepancy between the first map instance and the second map instance, a secure sensor is activated to generate a third map instance that includes third environmental information of the physical environment. In response to the third map instance verifying that the discrepancy accurately describes the physical environment, the first environmental information of the first map instance including the discrepancy is used to navigate the first autonomous vehicle.

In various embodiments of the method, in response to the third map instance verifying that the discrepancy inaccurately describes the physical environment, the first environmental information of the first map instance while ignoring the discrepancy is used to navigate the first autonomous vehicle.

In various embodiments of the method, in response to the third map instance verifying that the discrepancy inaccurately describes the physical environment, the third environmental information of the third map instance is used to navigate the first autonomous vehicle.

In various embodiments of the method, in response to the third map instance verifying that the discrepancy inaccurately describes the physical environment, a security notification identifying the discrepancy is provided to at least one of the physical environment monitoring unit and the second autonomous vehicle.

In various embodiments of the method, the first map instance is provided to at least one of the physical environment monitoring unit and the second autonomous vehicle within the physical environment. In other embodiments the receiving of the second map instance includes using a transport layer security (TLS) protocol for authentication. In yet other embodiments of the method, a validation from the physical environment monitoring unit that the second map instance is validated is received. The physical environment monitoring unit receives authentication information from a server device for the validation and acts as a proxy certificate authority using the authentication information.

In various embodiments of the method the secure sensor is a different type of sensor than the first sensor. In various embodiments, the secure sensor is not active when the first environmental information is generated by the first sensor. In various embodiments, the secure sensor is only activated to generate the third map instance in response to the discrepancy so that the secure sensor has less exposure time to an interfering signal than the first sensor.

In some embodiments in accordance with the present disclosure, an autonomous vehicle is disclosed. The autonomous vehicle includes a chassis; a sensor system that is housed or provided on the chassis and that includes a first sensor and a secure sensor; a communication system housed in the chassis; a drive system; a processing system that is housed in the chassis and coupled to the sensor system, the drive system, and the communication system; and a memory system that is coupled to the processing system and that includes instructions that, when executed by the processing system, cause the processing system to provide autonomous vehicle controller. The autonomous vehicle controller is configured to generate a first map instance of a physical environment using first environmental information generated by the first sensor; receive a second map instance, via the communication system, from at least one of a second autonomous vehicle or a physical environment monitoring unit located in the physical environment, wherein the second map instance includes second environmental information; correlate the first map instance with the second map instance based on a first time stamp in the first environmental information and a second time stamp in the second environmental information; in response to a discrepancy between the first map instance and the second map instance, activate the secure sensor to generate a third map instance that includes third environmental information of the physical environment; and in response to the third map instance verifying that the discrepancy accurately describes the physical environment, use the first environmental information of the first map instance including the discrepancy to navigate via the drive system.

In various embodiments of the autonomous vehicle the autonomous vehicle controller is configured to, in response to the third map instance verifying that the discrepancy inaccurately describes the physical environment, use the third environmental information of the third map instance to navigate via the drive system.

In various embodiments of the autonomous vehicle the secure sensor is a different type of sensor than the first sensor. In various embodiments the secure sensor is not active when the first environmental information is generated by the first sensor.

In some embodiments in accordance with the present disclosure a tangible machine-readable storage medium is described that include machine readable instructions which, when executed, cause one or more processors of a device to perform operations comprising: generating a first map instance of a physical environment using first environmental information generated by a first sensor of a first autonomous vehicle; receiving a second map instance from at least one of a second autonomous vehicle or a physical environment monitoring unit located in the physical environment, wherein the second map instance includes second environmental information; correlating the first map instance with the second map instance based on a first time stamp in the first environmental information and a second time stamp in the second environmental information; in response to a discrepancy between the first map instance and the second map instance, activating a secure sensor to generate a third map instance that includes third environmental information of the physical environment; and in response to the third map instance verifying that the discrepancy accurately describes the physical environment, using the first environmental information of the first map instance including the discrepancy to navigate the first autonomous vehicle.

In various embodiments of the operations further include, in response to the third map instance verifying that the discrepancy inaccurately describes the physical environment, using the first environmental information of the first map instance while ignoring the discrepancy to navigate the first autonomous vehicle.

In various embodiments of the operations further include, in response to the third map instance verifying that the discrepancy inaccurately describes the physical environment, using the third environmental information of the third map instance to navigate the first autonomous vehicle.

In various embodiments of the operations further include, in response to the third map instance verifying that the discrepancy inaccurately describes the physical environment, providing a security notification identifying the discrepancy to at least one of the physical environment monitoring unit and the second autonomous vehicle.

In various embodiments of the operations further include, receiving a validation from the physical environment monitoring unit that the second map instance is validated.

As mentioned, the systems and methods of the present disclosure provide for an autonomous vehicle sensor security system. As discussed, above sensor information received by sensors of an autonomous vehicle are important in navigating the autonomous vehicle through a physical environment. Because of the importance of sensor information, manipulation of this sensor information may be the basis of an attack on an autonomous vehicle, which may cause unsafe and/or unwanted maneuvers (e.g., sudden stopping, exceed speeding limits, going into the opposite directions, etc.) by the autonomous vehicle within the environment. The potential security risk may involve an attacker broadcasting inaccurate return messages to sensors such as radar or lidar that confuse the sensors. The interfering sensor feeds may include fake sensor feeds that purposely propagate and direct confusing signals to the radar/lidar receptors to be mixed with the valid reflecting waves, so the autonomous vehicle interprets the sensor information generated at the sensor based on the reflecting wave incorrectly. The interfering sensor feed may manipulate the signal projected by the autonomous vehicle and reflect a manipulated signal that shows wrong information (e.g., wrong speed limits, permanent obstructions, new traffic rules, incorrect road conditions (e.g., rain, snow, and the like) when those conditions do not really exist), etc.). These malicious sensor feeds (e.g., a fake signal projected to the vehicle to show an obstacle that does not existent or another fictitious moving object) are hazardous because it will impact the decision-making process inside the autonomous vehicle and may cause performance of hazardous maneuvers.

The systems and methods of the present disclosure provide an autonomous vehicle sensor security system. In various embodiments, autonomous vehicles in the physical environment and/or Roadside Equipment (RSE) unit may generate a periodic "map instance", and then each autonomous vehicle and/or RSE unit transmits its own map instance in the vicinity to be received by every other autonomous vehicle and/or RSE unit. The map instance may be a lightweight file (for faster transmission and processing in real-time speed) and may include sensor information about the physical environment such as, for example, a time stamp when the map instance is created, a geographical coordinate of fixed objects in the physical environment, approximate shape and dimension data of moving and fixed objects, a geometry of the road, weather information, moving objects with speed and directions, and/or any other information that would be apparent to one of skill in the art of the present disclosure. The map instance files may be exchanged securely between the autonomous vehicles and the RSE unit by using, for example, two-way Transport Layer Security (TLS) for authentication where the RSE units may function as proxy certificate authorities to authenticate autonomous vehicles. The RSE unit will be connected to a central system (e.g., a certificate authority) where the RSE unit obtains the TLS information for faster authentication checks, instead of sending a signal all the way to the certificate authority itself. Thus, the RSE unit will function as a proxy/local certificate authority for TLS communications. As such, each autonomous vehicle will keep broadcasting a public key in the vicinity with the map instance files, which may be generated and transmitted a plurality times per second.

Every participating autonomous vehicle receives these map instances and compares them to the map instance the autonomous vehicle has created for the given time. For mobbing objects, the autonomous vehicle will calculate the expected/updated location based on the information included in the complied map instance files (that have speed and direction of this particular moving object) and time. If the autonomous vehicle finds that its own map instance file matches the received map instance files from other autonomous vehicles and RSEs, then it will proceed accordingly. However, if there is a discrepancy (e.g., a moving object just came suddenly that could be real or just fake signal as a result of malicious signal manipulation), the autonomous vehicle will activate a secure sensor such as a backup targeted intelligent camera to the direction of the suspected location to double check the existence of the newly arisen object or condition. The secure sensor will be turned on only if there is a discrepancy, so it has less exposure time to any interfering wave/signal propagation. In various examples, the secure sensor should be able to be activated quickly to minimize unwanted maneuvers. Whenever a discrepancy is confirmed, the autonomous vehicle will broadcast a cautionary message to other autonomous vehicles so other autonomous vehicles can pay attention and go through their own verification process. The autonomous vehicle may then navigate according to the confirmed environment information received by the sensor system and/or the secure sensor while ignoring the discrepancy.

Referring now to FIG. 1, an embodiment of an autonomous vehicle sensor security system 100 is illustrated. In the illustrated embodiment, the autonomous vehicle sensor security system 100 includes an autonomous vehicle 102a and an autonomous vehicle 102b (e.g., a self-driving vehicle) provided in a physical environment 104. The physical environment 104 may be any indoor and/or outdoor space that may be contiguous or non-contiguous. For example, the physical environment 104 may include a roadway, a tunnel, a bridge, a waterway, a railway, and/or any other transportation infrastructure that would be apparent to one of skill in the art. In other examples, the physical environment 104 may include a yard, a home, a business, a park, a stadium, a museum, an amusement park, an access space, an underground shaft, an airspace, a body of water, and/or other spaces. The physical environment 104 may be defined by geofencing techniques that may include specific geographic coordinates such as latitude, longitude, and/or altitude, and/or operate within a range defined by a wireless communication signal. The physical environment 104 may include a plurality of objects such as an object 106a and an object 106b (e.g., pedestrians, pets, signs, trees, rocks, stationary and/or moving vehicles, curbs, bicyclists, benches, a ball, and/or any other object that is in motion or stationary that would be apparent to one of skill in the art in possession of the present disclosure).

In various embodiments, the autonomous vehicles 102a and/or 102b may be implemented as an autonomous unmanned aerial vehicle (UAV), an autonomous car, an autonomous truck, an autonomous bus, an autonomous train, an autonomous submersible, an autonomous boat, any autonomous robot, and/or any unmanned or manned vehicular device that would be apparent to one of skill in the art in possession of the present disclosure. In alternative embodiments, a robot, an unmanned vehicular device (e.g., land or water), and/or another vehicular device may be employed. In the illustrated examples of the present disclosure, the autonomous vehicle is depicted as an autonomous automobile. In various embodiments, vehicles may be described as autonomous which may include fully-autonomous vehicles and/or semi-autonomous vehicles. As such, the autonomous vehicles 102a and/or 102b may each include an autonomous vehicle controller for making and executing decisions for the autonomous vehicles 102a and/or 102b.

In various embodiments, the autonomous vehicle sensor security system 100 may include a roadside equipment (RSE) unit 108. The RSE unit 108 may be provided in the physical environment 104 to detect the autonomous vehicle 102a and/or 102b by communicating and coordinating with the autonomous vehicle 102a and/or 102b and/or other RSE units. Of course, in various embodiments, some or all of the components of the RSE unit 108 could be physically located other than "roadside", such as in a cabinet, a traffic controller, a signal head, a buoy, or otherwise. Thus, while the present disclosure discusses an RSE unit when referring to autonomous automobiles, the RSE unit 108 may be generally referred to as a physical environment monitoring unit and may be provided in a physical environment (e.g., bodies of water, in the atmosphere, in a field) where other types of autonomous vehicles other than autonomous automobiles are present. The RSE unit 108 may be used to control many different types of traffic equipment and can be used to collect and send data about the physical environment 104 to a central monitoring station for further analysis or action and/or the autonomous vehicle 102a and/or the autonomous vehicle 102b, using common networking and communication techniques, commonly specified 5G or subsequently developed adaptive multi-bandwidth approaches.

As such, the autonomous vehicle 102a, the autonomous vehicle 102b, and the RSE unit 108 may include communication units having one or more transceivers to enable the autonomous vehicle 102a and the autonomous vehicle 102b to communicate with each other and/or a server device 110. Accordingly and as discussed in further detail below, the autonomous vehicle 102a may be in communication with the autonomous vehicle 102b and/or the RSE unit 108 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the autonomous vehicle 102a, the autonomous vehicle 102b, and/or the RSE unit 108 in the autonomous vehicle sensor security system 100 of FIG. 1 include first (e.g., long-range) transceiver(s) to permit the autonomous vehicle 102a, the autonomous vehicle 102b, and/or the RSE unit 108 to communicate with a network 112 via a communication channel 114a, a communication channel 114b, a communication channel 114c, respectively. The network 112 may be implemented by an example mobile cellular network, such as a long-term evolution (LTE) network or other third generation (3G), fourth generation (4G) wireless network, or fifth-generation (5G) wireless network. However, in some examples, the network 112 may be additionally or alternatively be implemented by one or more other communication networks, such as, but not limited to, a satellite communication network, a microwave radio network, and/or other communication networks.

The autonomous vehicle 102a, the autonomous vehicle 102b, and/or the RSE unit 108 additionally may include second (e.g., short-range) transceiver(s) to permit the autonomous vehicle 102a, the autonomous vehicle 102b, and/or the RSE unit 108 to communicate with each other via communication channels 116a, 116b, and 116c. In the illustrated example of FIG. 1, such second transceivers are implemented by a type of transceiver supporting short-range (e.g., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceiver, and other transceivers that are configured to allow the autonomous vehicle 102a, the autonomous vehicle 102b, and/or the RSE unit 108 to intercommunicate via an ad-hoc or other wireless network.

The autonomous vehicle 102a, the autonomous vehicle 102b, and/or the RSE unit 108 may also include a sensor system, as discussed in more detail below, that may obtain environmental information about the physical environment 104 in which the autonomous vehicle 102a, the autonomous vehicle 102b, and/or the RSE unit 108 operate. The autonomous vehicle 102a, the autonomous vehicle 102b, and/or the RSE unit 108 may communicate the environmental information with each other, to the server device 110, and/or use the environmental information to generate instructions that may be provided to the autonomous vehicle 102a, the autonomous vehicle 102b, and/or the RSE unit 108.

The autonomous vehicle sensor security system 100 also includes or may be in connection with a server device 110. For example, the server device 110 may include one or more server devices, storage systems, cloud computing systems, and/or other computing devices (e.g., desktop computing device(s), laptop/notebook computing device(s), tablet computing device(s), mobile phone(s), etc.). As discussed below, the server device 110 may be coupled to an autonomous vehicle sensor security database 118 that is configured to provide repositories such as an autonomous vehicle authentication repository of autonomous vehicle authentication identifiers for autonomous vehicles within the physical environment 104. Also, as discussed below, the server device 110 may be configured to provide an autonomous vehicle controller that computationally processes sensor data (e.g., sensor data that includes environmental information, vehicle information, and/or other information) received from RSE unit 108 and/or the autonomous vehicles 102a and/or 102b and render instructions to the autonomous vehicles 102a and/or 102b and/or RSE unit 108). While a specific autonomous vehicle sensor security system 100 has been illustrated and described, one of skill in the art in possession of the present disclosure will recognize that the teachings of the present disclosure will be beneficial for a variety of autonomous vehicle sensor security systems that would be apparent to one of skill in the art in possession of the present disclosure and, as such, a wide variety of modifications to the number, types, and orientation of devices in the autonomous vehicle sensor security system 100 will fall within the scope of the present disclosure as well.

Figure 2:
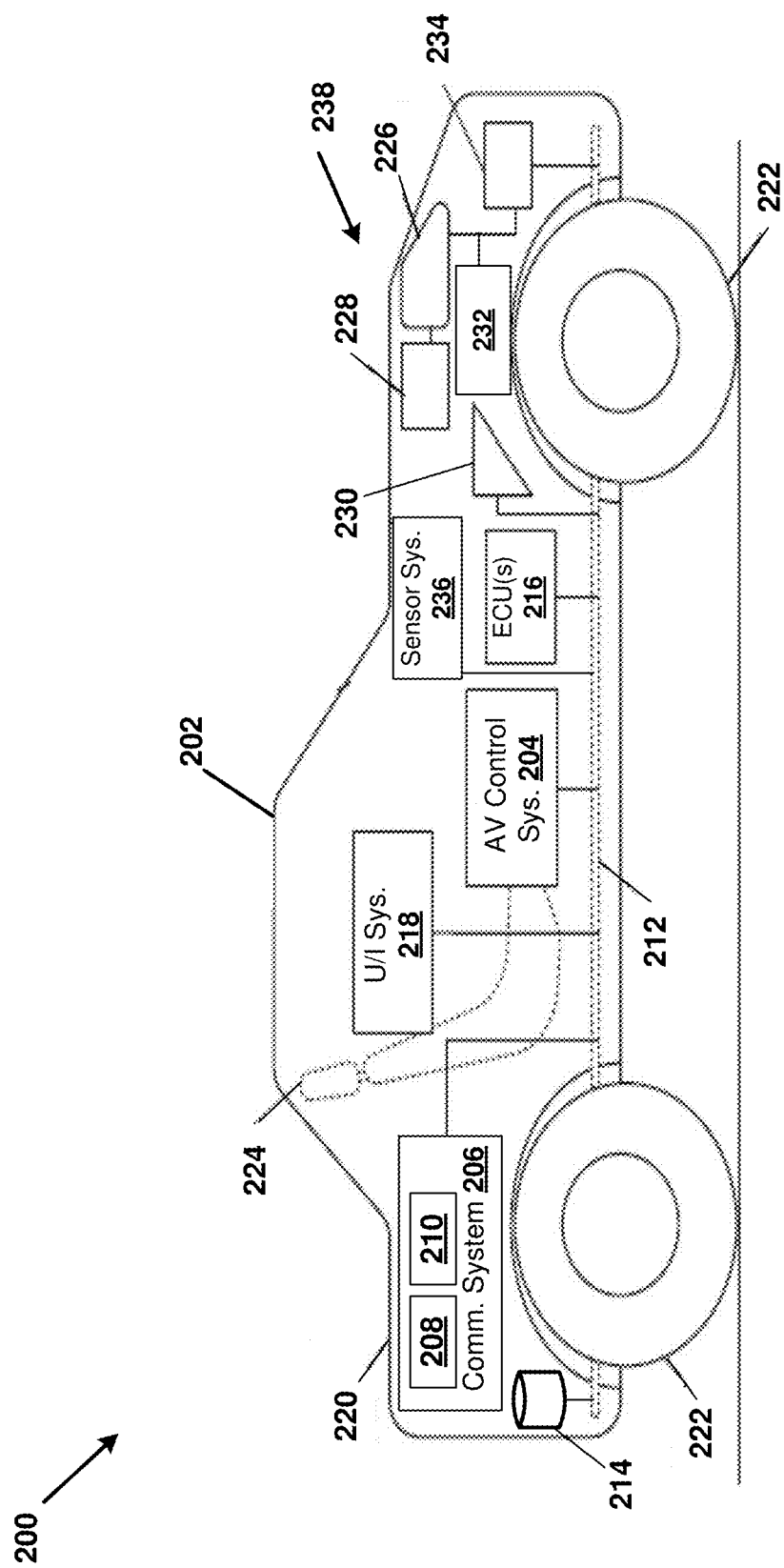
FIG. 2 is a schematic view illustrating an embodiment of an autonomous vehicle used in the autonomous sensor security system of FIG. 1.

Referring now to FIG. 2, an embodiment of an autonomous vehicle 200 is illustrated that may be the autonomous vehicles 102a and/or 102b discussed above with reference to FIG. 1. While the autonomous vehicle 200 is illustrated as an autonomous car, one of skill in the art in possession of the present disclosure may recognize that the autonomous vehicle 200 may be provided by a UAV, a robot, an unmanned vehicular device (e.g., land or water), and/or other vehicular device described above and that would be apparent to one of skill in the art in possession of the present disclosure. In the illustrated embodiment, the autonomous vehicle 200 includes a chassis 202 that houses the components of the autonomous vehicle 200. Several of these components are illustrated in FIG. 2. For example, the chassis 202 may house a processing system (not illustrated) and a non-transitory memory system (not illustrated) that includes instructions that, when executed by the processing system, cause the processing system to provide an autonomous vehicle controller 204 that is configured to perform the functions of the autonomous vehicle controllers and/or the autonomous vehicles discussed below.

The chassis 202 may further house a communication system 206 that is coupled to the autonomous vehicle controller 204 (e.g., via a coupling (e.g., a bus 212) between the communication system 206 and the processing system). The communication system 206 may include software or instructions that are stored on a computer-readable medium and that allow the autonomous vehicle 200 to send and receive information through the communication networks discussed above. For example, the communication system 206 may include a first communication interface 208 to provide for communications through the communication network 112 as detailed above (e.g., first (e.g., long-range) transceiver(s)). In an embodiment, the first communication interface 208 may be a wireless antenna that is configured to provide communications with IEEE 802.11 protocols (Wi-Fi), cellular communications, satellite communications, other microwave radio communications and/or communications. The communication system 206 may also include a second communication interface 210 that is configured to provide direct communication with other autonomous vehicles, the RSE unit 108, and/or other devices within the physical environment 104 discussed above with respect to FIG. 1 (e.g., second (e.g., short-range) transceiver(s)). For example, the second communication interface 210 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The communication system 206 of the illustrated example manages communications between the autonomous vehicle 200 and network entities (e.g., a car manufacturer, a telecommunication service provider, an internet service provider, a media provider, a certificate authority, etc.) via a wired and/or wireless connection (e.g., an IEEE 802.11 wireless connection, a Bluetooth connection, a cable/DSL/satellite modem, a cell tower, etc.). The communication system 206 of the illustrated example maintains network information (e.g., a network address, network settings, etc.) required to send and/or receive data over the various communication platforms. The communication system 206 manages the connections between the vehicle and outside entities (e.g., a Bluetooth connection between a mobile device and the example autonomous vehicle controller 204). In some examples, the communication system 206 may establish communicative connections with service providers that may provide a server device 110 and/or different network entities (e.g., a car manufacturer, a telecommunication service provider, an internet service provider, a media provider, a certificate authority, etc.) to send data from the autonomous vehicle 200 to the network entities and/or receive data from the network entities for delivery to the vehicle (e.g., driving profiles). In addition, the communication system 206 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the autonomous vehicle 200 via the communication system 206 may transmit and receive information, such as vehicle diagnostic data, media files (e.g., movies, music, television programs, etc.) uploaded to a memory of the autonomous vehicle 200, firmware and/or software updates, driving profiles, environmental information about the physical environment 104, authentication identifiers (e.g., cryptographic keys), and/or other autonomous vehicle information that would be apparent to one of skill in the art in possession of the present disclosure.

The chassis 202 may also house an autonomous vehicle storage system 214 that is coupled to the autonomous vehicle controller 204 through the processing system (e.g., via the bus 212). The autonomous vehicle storage system 214 may store sensor data, autonomous vehicle instructions and rules, security files (e.g., map instances), and/or any other information or instructions that would be apparent to one of skill in the art in possession of the present disclosure.

The chassis 202 may also house a plurality of ECUs 216 that are coupled (e.g., via the bus 212) to the autonomous vehicle controller 204 through the processing system. The example ECUs 216 of FIG. 2 may be discrete computing devices. The example ECUs 216 may include a processor (e.g., a microcontroller) to process data and execute programmable instructions (e.g., assembly level instructions, functional sequential instructions, and/or object-oriented instructions). The example ECUs 216 also are provided with on-board memory (e.g., Static Random Access Memory (SRAM), Electrically Erasable Programmable Read Only Memory (EEPROM), and/or Flash memory) to store data received and/or generated by the ECU 216. The example ECUs 216 are further provided with Input and/or Output (I/O) ports such as supply voltage inputs, digital and/or analog inputs, relay drivers, H-bridge drivers, injector drivers, and/or logic outputs. These I/O ports are used by the ECU 216 to receive data from sensors and transmit signals to mechanical components (e.g., actuators) to affect the mechanical components operations based on the operating parameters of the autonomous vehicle 200. The received data and/or the transmitted signals are communicated from the ECU 216 via the data bus 212 or through a directly wired connection between the ECU 216 and the mechanical component.

The example ECUs 216 of FIG. 2 control low level systems (e.g., door controls, headlight controls, engine controls, transmission controls, climate controls, seat controls, mirror controls, etc.) and/or high-level systems (e.g., radio systems, voice controls, entertainment systems, a telematic control unit managing a GPS/Navigation system, etc.) connected to the data bus 212. Each ECU 216 monitors its corresponding system by reading sensor signals. These sensors are placed on the mechanical components of the system and report factors such as position, temperature, speed, etc. These factors contribute to if, when, and/or how the ECU 216 generates output signals to execute control over the corresponding system.

For example, the ECU 216 responsible for door control has sensors monitoring door lock buttons, position of doors (e.g., open or closed), door locks (e.g., engaged or disengaged), and/or child lock switches (e.g., engaged or disengaged). Based on the readings of these sensors, the door control ECU 216 may, for example, decide on whether to generate a lock engaging signal to the doors of the vehicle.

Each of the ECUs 216 may be of different size and/or complexity according to the system the individual ECU 216 is controlling. In the illustrated example, the ECUs 216 are in communication with other units of the vehicle via the data bus 216. In some examples, the ECUs 216 may send and/or receive information and/or driving profiles (e.g., the status of the systems or components of the vehicle, diagnostic information, telemetry data, environmental information, etc.) to a remote device (e.g., a mobile device such as a smartphone, tablet, smartwatch, etc.) via the communication system 206 and/or may receive information (e.g., commands, driving profiles, operating parameters, firmware/software updates, media files, environmental information, etc.) from the remote device via the communication system 206. For example, such information may be communicated between the ECUs 216 and the remote device using a Bluetooth, Wi-Fi, or near field communication (NFC) connection generated and/or managed by the communication system 206.

Typically, the ECUs 216 are deployed in a one-to-one fashion. That is, each ECU 216 is provided with processing power and system memory ample enough to control a corresponding single system of the vehicle. Each ECU 216 will vary in size according to the complexity of the corresponding system. In some examples, however, the ECUs 216 in the example autonomous vehicle 200 may be more robust than a typical ECU and capable of controlling multiple systems (e.g., an ECM of the ECMs 216 may control the engine and the transmission system). For example, a robust ECU may be provided with amounts of processing power greater than a typical ECU processor (e.g., more cores, faster clocking speeds, larger processing cache, etc.) and higher amounts of random access memory (RAM) may control more than one system as is typical of the average ECU.

The chassis 202 of the autonomous vehicle 200 may also house a user interface system 218 coupled to the autonomous vehicle controller 204 through the processing system. The user interface system 218 may include components such as a dashboard display, a media center, a center console display, user accessible buttons (e.g., climate controls, door lock controls), etc. The user interface system 218 may also include a data store to store media (e.g., movies, music, television programs, podcasts, etc.), system firmware, navigation data, diagnostic information, data collected by data collection systems (e.g., cameras mounted externally on the autonomous vehicle, weather data collection, etc.), driving profiles, etc. The example user interface system 218 also functions as a human machine interface that provides options to the user of the autonomous vehicle 200 and communicates the user's selected options to the corresponding ECU 216 and/or the autonomous vehicle controller 204.

In the illustrated example of FIG. 2, the chassis 202 of the autonomous vehicle 200 may include a body 220, at least two wheels 222, a seat 224, a motor 226, a cooling system 228, a transmission 230, a braking system 232, and/or battery 234 (e.g., an electrical system). In the illustrated example, the body 220 covers the exterior of the autonomous vehicle 200 to protect and/or contain the other parts of the autonomous vehicle 200. In various embodiments of the autonomous vehicle of FIG. 2, the ECUs 216, via commands from the autonomous vehicle controller 204, may control the braking system 232, the cooling system 228, the transmission 230, the motor 226 and/or any other autonomous vehicle systems that are apparent to one of skill in the art in possession of the present disclosure. In various embodiments, components that enable the autonomous vehicle 200 to steer, accelerate, deaccelerate, and/or perform any other mechanical functions may be referred to a drive system 238. As such, the drive system 238 may include the at least two wheels 222, the motor 226, the cooling system 228, the transmission 232 and/or any other system used to navigate the autonomous vehicle 200 in the physical environment 104.

In the illustrated example, the motor 226 may be implemented by a combustion engine, a DC electric motor, and/or an AC electric motor. The motor 226 may be communicatively coupled to the ECUs 216 and the transmission 230. The example ECU 216 may receive operating power from batteries 234 to control components of the motor 226 (e.g., throttle valve, sparkplugs, pistons, fuel injectors, etc.). The ECU 216 for the motor 226 receives signals from a user (e.g., via sensors in a pedal, etc.) and/or the autonomous vehicle controller 204 to determine corresponding control signals to communicate to the example motor 226 (e.g., manipulating throttle valve, firing spark plugs, altering fuel injection quantities, etc.). In the illustrated example, the motor 226 supplies torque to the transmission 230 to drive two or more wheels 222.

In various embodiments, the autonomous vehicle 200 may include a sensor system 236 that may be housed in the chassis 202 and/or provided on the chassis 202. The sensor system 236 may be coupled (e.g., coupled via the bus 212) to the autonomous vehicle controller 204 via the processing system. The sensor system 236 may include one or more sensors that gather sensor data about the autonomous vehicle 200 and/or physical environment 104 that may be provided to the autonomous vehicle controller 204 via the bus 212. The sensor data (e.g., environmental data) may be used by the autonomous vehicle controller 204 to make decisions regarding control signals to provide to ECUs 216 of the autonomous vehicle 200 to control the various systems when the autonomous vehicle 200 is in use and navigating the physical environment 104.

Figure 3:
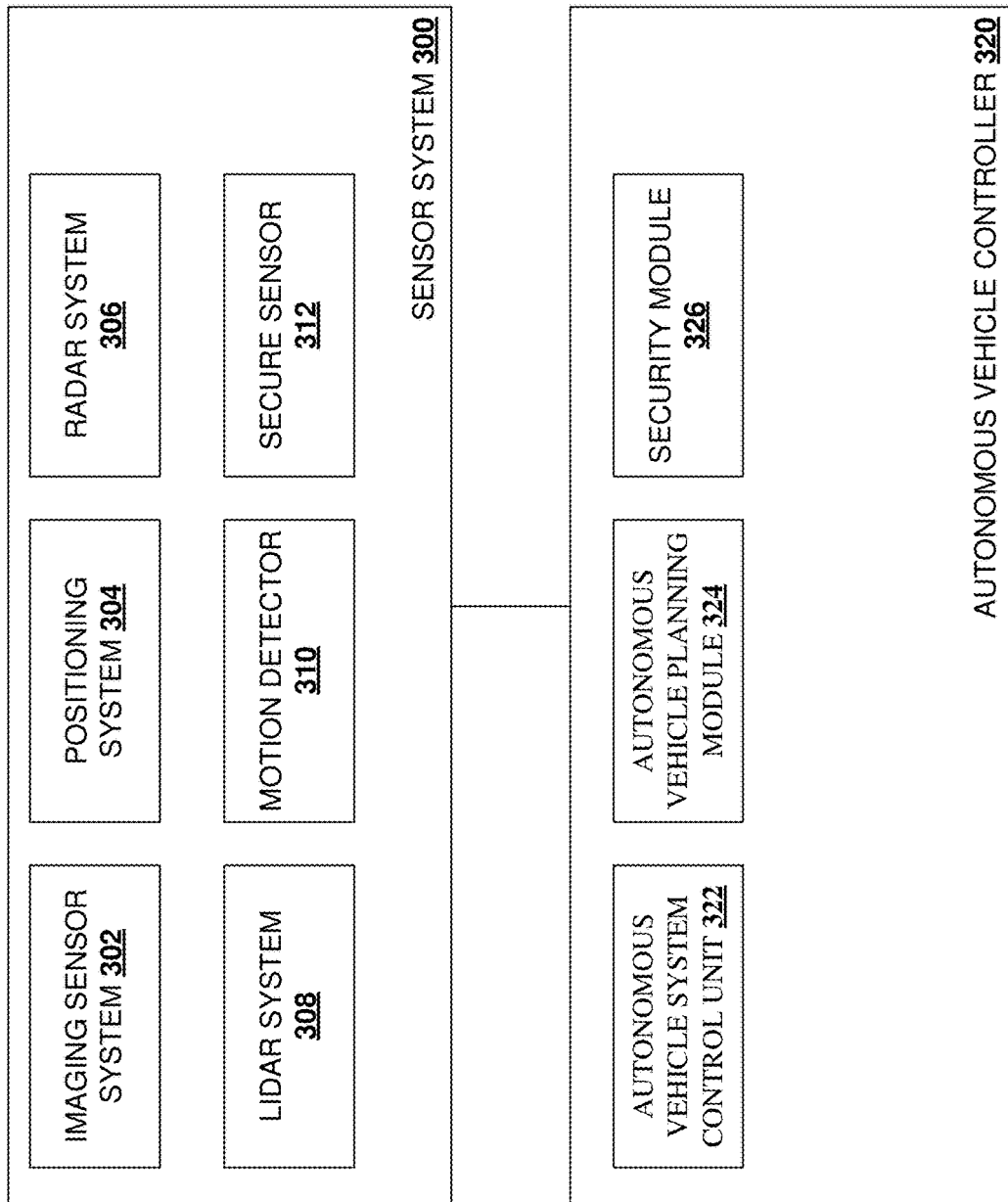
FIG. 3 is a schematic view illustrating an embodiment of a sensor system and an autonomous vehicle controller of the autonomous vehicle of FIG. 2.

Referring to FIG. 3, the sensor system 300 is illustrated that may be the sensor system 236 of FIG. 2. The sensor system 300 may include an imaging sensor system 302, a positioning system 304, a radar system 306, a lidar system 308, a motion detector 310, a secure sensor 312, and/or any other sensors that would be apparent to one of skill in the art in possession of the present disclosure used for autonomously navigating the autonomous vehicle 200 through the physical environment 104 and/or operating the autonomous vehicle 200. In various embodiments, the imaging sensor system 302 may include a plurality of imaging sensors that provide on various locations of the chassis 202. For example, the imaging sensors may include, a two-dimensional image capturing camera, a three-dimensional image capturing camera, an infrared image capturing camera, a depth capturing camera, similar video recorders, and/or a variety of other image capturing devices. The imaging sensor system 302 may be used to gather visual information from the physical environment 104 surrounding the autonomous vehicle 200, for use in recognizing an object (e.g., objects 106a and 106b) in the physical environment 104, and other functionality with the autonomous vehicle 200. In various examples, the imaging sensor may be mechanically movable, for example, by mounting the camera on a rotating and/or tilting a platform.

The sensor system 300 may also include the positioning system 304 that is coupled to the autonomous vehicle controller 204. The positioning system 304 may include sensors for determining the location and position of the autonomous vehicle 200 in the physical environment 104. For example, the positioning system 304 may include a global positioning system (GPS) receiver, a real-time kinematic (RTK) GPS receiver, a differential GPS receiver, a Wi-Fi based positioning system (WPS) receiver, an accelerometer, and/or other positioning systems and components.

The sensor system 300 may include a radar system 306 which may represent a system that utilizes radio signals to sense objects within the physical environment 104 of the autonomous vehicle 200. In some embodiments, in addition to sensing objects, the radar system 306 may additionally sense the speed and/or heading of the objects.

The sensor system 300 may include the lidar system 308, the lidar system 308 may include a light generator, for example, a laser device (e.g., a laser used in lidar (e.g., sometimes referred to as an acronym for light detection and ranging (LIDAR)), a laser scanner, a flash device (e.g., a flash LED, an electronic flash, etc.), and/or any other light generator for use in lidar and/or photogrammetry applications that would be apparent to one of skill in the art in possession of the present disclosure. The lidar system 308 may include an imaging sensor or light detector in capturing the light from the light generator that is reflected from objects (e.g., objects 106a and/or 106b) in the physical environment 104. For example, the lidar system 308 may utilize any of the imaging sensors in the imaging sensor system 302 or include its own imaging sensor (e.g., camera).

The sensor system 300 may also include a motion detector 310. The motion detector 310 may include an accelerometer, a gyroscope, and/or any other sensor for detecting and/or calculating the orientation and/or movement of the autonomous vehicle 200. In various embodiments of the present disclosure, the sensor system 300 includes a secure sensor 312 that may include a imaging sensor, a radar system, a lidar system, and/or any other sensor that is distinct from the imaging sensor system 302, the radar system 306, and/or the lidar system 308 and can obtain environmental information to verify sensor signals received by the imaging sensor system 302, the radar system 306, and/or the lidar system 308 as genuine or interfering (e.g., malicious signals) when a discrepancy is found in signals captured by these sensor systems from the physical environment 104 and discussed in further detail below.

The sensor system 300 may further include other sensors, such as, a lighting sensor (to detect visual communications as described herein), a sonar sensor, an infrared sensor, a steering sensor, a throttle sensor, a braking sensor, and an audio sensor (e.g., a microphone). An audio sensor may be configured to capture sound from the physical environment 104 surrounding the autonomous vehicle 200. A steering sensor may be configured to sense the steering angle of a steering wheel, wheels 222 of the autonomous vehicle 200, or a combination thereof. A throttle sensor and a braking sensor sense the throttle position and braking position of the autonomous vehicle 200, respectively. In some situations, a throttle sensor and a braking sensor may be integrated as an integrated throttle/braking sensor.

FIG. 3 also illustrates an autonomous vehicle controller 320 coupled to the sensor system 300 and that may be the autonomous vehicle controller 204 of FIG. 2. The autonomous vehicle controller 320 may include an autonomous vehicle system control unit 322 that includes modules that control and interact with the various systems of the autonomous vehicle 200. For example, autonomous vehicle system control unit 322 may communicate via the bus 212 via the various ECUs 216. In one embodiment, the autonomous vehicle system control unit 322 includes, but is not limited to, a steering unit, a throttle unit (also referred to as an acceleration unit), a braking unit, a signaling unit, a transmission unit, and/or any other autonomous vehicle system unit that would be apparent one of skill in the art in possession of the present disclosure. For example, the autonomous vehicle system control unit 322 may be configured to communicate with respective ECUs for the brake system, the throttle system, the steering system. For example, the steering unit may adjust the direction or heading of the autonomous vehicle 200. The throttle unit may control the speed of the motor 226 or engine that in turn control the speed and acceleration of the autonomous vehicle 200. The braking unit may control the braking system 232 to decelerate the autonomous vehicle 200 by providing friction to slow the wheels 222 or tires of the autonomous vehicle. Accordingly, a driving maneuver may include any driving actions performed by the autonomous vehicle 200, for example, by using one, or a combination, of the steering unit, throttle unit, and braking unit.

The autonomous vehicle controller 320 may also include autonomous vehicle planning module 324. The autonomous vehicle planning module 324 may include a plurality of modules for perceiving the physical environment 104 and planning a route through the physical environment 104 according to instructions received by a user or externally provided data subsystem application. For example, the autonomous vehicle planning module 324 may manage environmental information such as localization data related to a trip or route of the user or application of the autonomous vehicle 200, such as for example a map, location information, route information, traffic information and other localization information.

Based on the sensor data provided by the sensor system 300 and environmental information obtained by localization module, a perception of the physical environment 104 is determined by the autonomous vehicle planning module 324. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The autonomous vehicle planning module 324 may include a computer vision system or functionalities of a computer vision system to process and analyze images captured by one or more imaging sensors of the imaging sensor system 302 in order to identify objects and/or features in the physical environment 104 of autonomous vehicle 200. The objects may include the objects 106a and/or 106b described above. The computer vision system may use an object recognition algorithm, video tracking, and other computer vision techniques. In some embodiments, the computer vision system can map an environment, track objects, and estimate the speed of objects, etc. The autonomous vehicle planning module 324 can also detect objects based on other sensors data provided by other sensors such as the radar system 306 and/or the lidar system 308.

For each of the objects, autonomous vehicle planning module 324 decides regarding how to handle the object. For example, for a particular object (e.g., another vehicle in a crossing route) as well as its metadata describing the object (e.g., a speed, direction, turning angle), the autonomous vehicle planning module 324 decides how to encounter the object (e.g., overtake, yield, stop, pass). The autonomous vehicle planning module 324 may make such decisions according to a set of rules such as traffic rules, which may be stored in the autonomous vehicle storage system 214. Based on a decision for each of the objects perceived, the autonomous vehicle planning module 324 plans a path or route for the autonomous vehicle 200, as well as driving parameters (e.g., distance, speed, and/or turning angle). That is, for a given object, the autonomous vehicle planning module 324 decides an action to take based on the object and how to take the action. The autonomous vehicle planning module 324 generates planning and control data including information describing how the autonomous vehicle 200 would move in a next interval. The planning and control data, is fed by the autonomous vehicle planning module 324 to the autonomous vehicle system control unit 322 that controls and drives the autonomous vehicle 200, by sending proper commands or signals to the autonomous vehicle system control unit 322, according to a route or path defined by the planning and control data. The planning and control data include sufficient information to drive the autonomous vehicle 200 from a first point to a second point of a route or path.

The autonomous vehicle controller 320 may also include a security module 326 that is configured to perform the functions of the security module and/or the autonomous vehicles discussed below. As discussed below, the security module 326 may generate map instances at a predetermined time interval. The map instance may include the environmental information of objects and/or features in the physical environment 104 identified by the autonomous vehicle planning module 324. For example, the map instance may include a time stamp of the time the map instance was created, geographical coordinates of fixed objects and roadside equipment, approximate shape and dimension of moving and fixed objects with speed and direction, street geometry, road conditions, weather conditions, geographical coordinates of moving object with speed and directions of the moving object and/or other environmental information that would be apparent to one of skill in the art in possession of the present disclosure. The security module 326 may also be configured to process map instances received from other autonomous vehicles and/or the RSE unit 108 in the physical environment 104 and compare the map instances received to map instances it creates to determine whether there are any discrepancies in the map instances as discussed in further detail below. While a specific autonomous vehicle 200, sensor system 300, and autonomous vehicle controller 320 has been illustrated and described, one of skill in the art in possession of the present disclosure will recognize that the teachings of the present disclosure will be beneficial for a variety of autonomous vehicles, sensor systems, and autonomous vehicle controllers that would be apparent to one of skill in the art in possession of the present disclosure and, as such, a wide variety of modifications to the number, types, and orientation of devices and modules in the autonomous vehicle 200, the sensor system 300, and the autonomous vehicle controller 320 will fall within the scope of the present disclosure as well.

Figure 4:
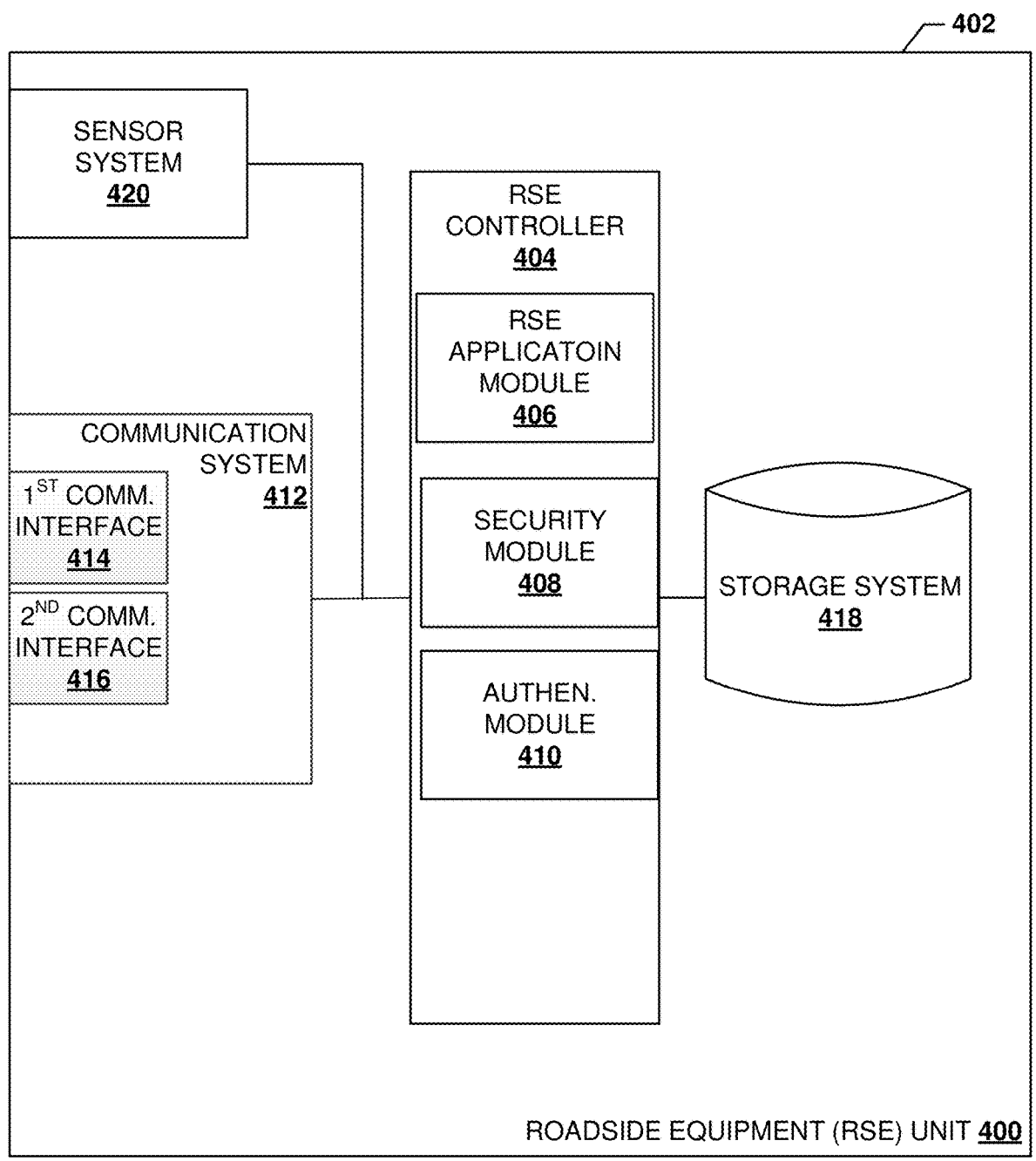
FIG. 4 is a schematic view illustrating an embodiment of a roadside equipment (RSE) unit used in the autonomous vehicle sensor security system of FIG. 1.

Referring now to FIG. 4, an embodiment of a roadside equipment (RSE) unit 400 is illustrated that may be the RSE unit 108 discussed above with reference to FIG. 1. In the illustrated embodiment, the RSE unit 400 includes a chassis 402 that houses the components of the RSE unit 400. Several of these components are illustrated in FIG. 4. For example, the chassis 402 may house a processing system (not illustrated) and a non-transitory memory system (not illustrated) that includes instructions that, when executed by the processing system, cause the processing system to provide an RSE controller 404 that is configured to perform the functions of the RSE controllers and/or the autonomous vehicles discussed below. In the specific example illustrated in FIG. 4, the RSE controller 404 is configured to provide an RSE application module 406 to perform specific functions of the RSE unit 400. For example, if the RSE unit 400 is a traffic light, the RSE application module 406 may include instructions to operate the signals of the traffic light. However, in other embodiments, the RSE unit 400 may be dedicated for facilitating autonomous vehicle traffic, as such the RSE application module 406 may be configured to generate and provide the specific autonomous vehicle instructions to the autonomous vehicles 102a and/or 102b in the physical environment 104. The RSE controller 404 may also include a security module 408 that may operate similar to the security module 326 discussed above in FIG. 3. As such, the security module 408 may generate map instances at a predetermined time interval based on environmental information generated by a sensor system. The security module 408 may also be configured to process map instances received from other autonomous vehicles and/or other RSE units in the physical environment 104 and compare the map instances received to map instances it creates to determine whether there is any discrepancy in the map instances as discussed in further detail below. The RSE controller 404 may also include an authentication module 410 that may be configured to perform the functions of the authentication modules discussed below (e.g., for authenticating autonomous vehicles in the physical environment 104 and map instances).

The chassis 402 may further house a communication system 412 that is coupled to the RSE controller 404 (e.g., via a coupling between the communication system 412 and the processing system). The communication system 412 may include software or instructions that are stored on a computer-readable medium and that allow the RSE unit to send and receive information through the communication networks discussed above. For example, the communication system 412 may include a first communication interface 414 to provide for communications through the network 112 as detailed above (e.g., first (e.g., long-range) transceiver(s)).

In an embodiment, the first communication interface 414 may be a wireless antenna that is configured to provide communications with IEEE 802.11 protocols (Wi-Fi), cellular communications, satellite communications, other microwave radio communications and/or communications. The communication system 412 may also include a second communication interface 416 that is configured to provide direct communication with the autonomous vehicles 102a and/or 102b, other RSE units, and/or other devices within the physical environment 104 discussed above with respect to FIG. 1 (e.g., second (e.g., short-range) transceiver(s)). For example, the second communication interface 212 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 402 may also house a storage system 418 that is coupled to the RSE controller 204 through the processing system. The storage system 418 may store sensor data, autonomous vehicle instructions, security files, map instances, authentication information (e.g., authentication certificates, cryptographic keys, and/or any other information or instructions that would be apparent to one of skill in the art in possession of the present disclosure.

In various embodiments, the RSE unit 400 may include a sensor system 420 that may be housed in the chassis 402 and/or provided on the chassis 402. The sensor system 420 may be coupled to the RSE controller 404 via the processing system. The sensor system 420 may include one or more sensors that gather sensor data about the RSE unit 400 and/or physical environment 104 that may be provided to the RSE controller 404 and more specifically to the security module 408. The sensor data may be used by the security module 408 to generate map instances. In various embodiments, the sensor system 420 may include the sensor system 300 of FIG. 3. While an RSE unit 400 has been illustrated and described, one of skill in the art in possession of the present disclosure will recognize that the teachings of the present disclosure will be beneficial for a variety of RSE units that would be apparent to one of skill in the art in possession of the present disclosure and, as such, a wide variety of modifications to the number, types, and orientation of devices and modules in the RSE unit 400 will fall within the scope of the present disclosure as well.

Figure 5:
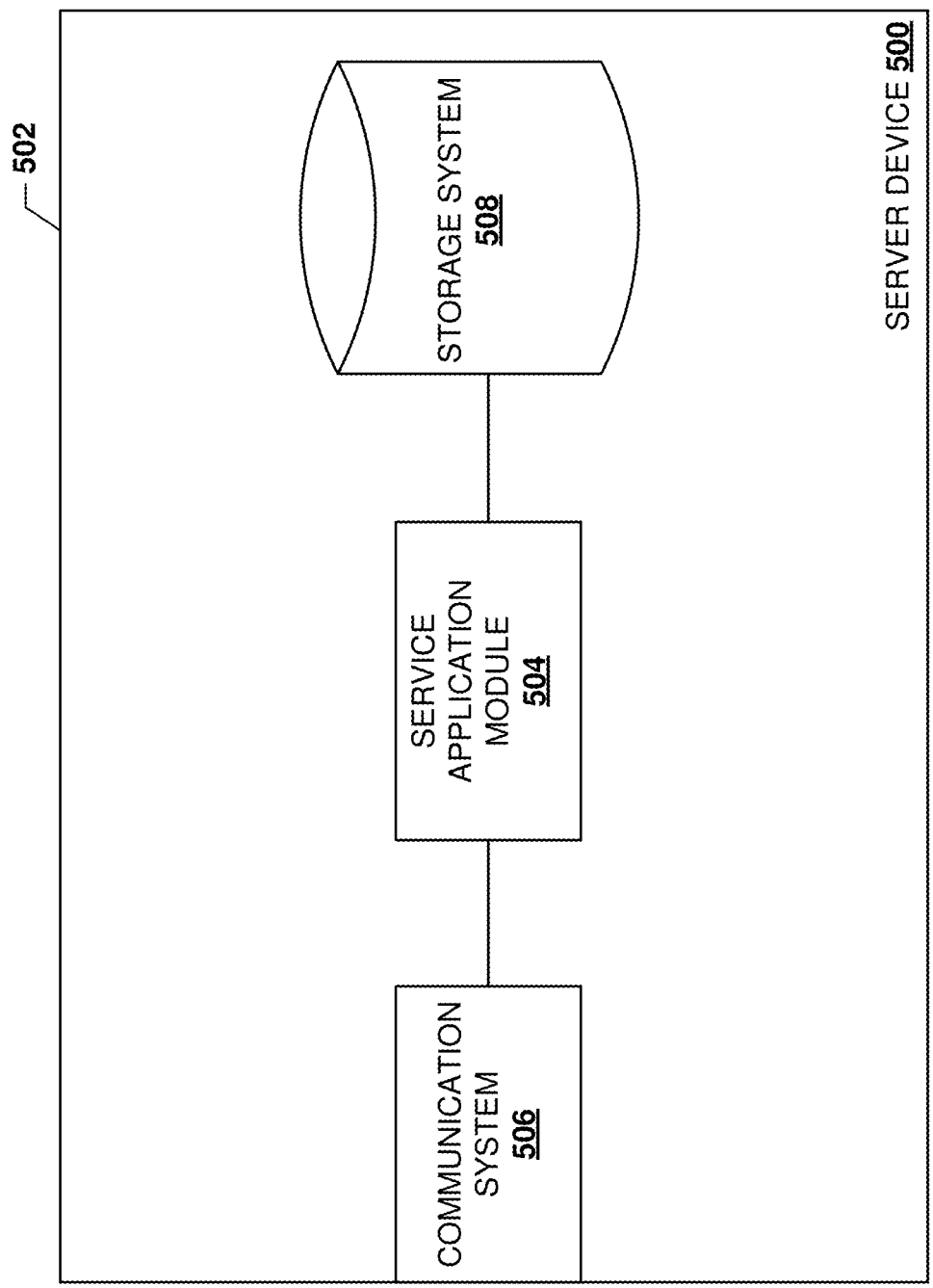
FIG. 5 is a schematic view illustrating an embodiment of a server device used in the autonomous vehicle sensor security system of FIG. 1.

Referring now to FIG. 5, an embodiment of a server device 500 is illustrated that may be the server device 110 discussed above with reference to FIG. 1. In various embodiments, the server device 500 is a certificate authority server device that provides certificates in TLS communications, however other server device that provide other services are contemplated as well. In the illustrated embodiment, the server device 500 includes a chassis 502 that houses the components of the server device 500, only some of which are illustrated in FIG. 5. For example, the chassis 502 may house a processing system (not illustrated) and a non-transitory memory system (not illustrated) that includes instructions that, when executed by the processing system, cause the processing system to provide a service application module 504 that is configured to perform the functions of the service application module and/or server devices discussed below. In the specific example illustrated in FIG. 5, the service application module 504 is configured as an authentication module to verify the autonomous vehicles 102a and/or 102b and RSE units 108 in an embodiment such that map instances may be securely transferred and trusted between the autonomous vehicles 102a and/or 102b and the RSE unit 108 within the physical environment 104. However, one of skill in the art in possession of the present disclosure will recognize that the service application module may provide any number of services from various service providers.

The chassis 502 may further house a communication system 506 that is coupled to the service application module 504 (e.g., via a coupling between the communication system 506 and the processing system) and that is configured to provide for communication through the network 112 as detailed below. The communication system 506 may allow the server device 500 to send and receive information over the network 112 of FIG. 1. The chassis 502 may also house a storage device (not illustrated) that provides a storage system 508 (e.g., the autonomous vehicle database 118) that is coupled to the service application module 504 through the processing system. The storage system 508 may be configured to store authentication credentials, cryptographic keys and/or certificates used to authenticate communication within the autonomous vehicle sensor security system 100. While a specific server device 500 has been illustrated and described, one of skill in the art in possession of the present disclosure will recognize that the teachings of the present disclosure will be beneficial for a variety of server devices that would be apparent to one of skill in the art in possession of the present disclosure and, as such, a wide variety of modifications to the number, types, and orientation of devices and modules in the server device 500 will fall within the scope of the present disclosure as well.

Figure 6:
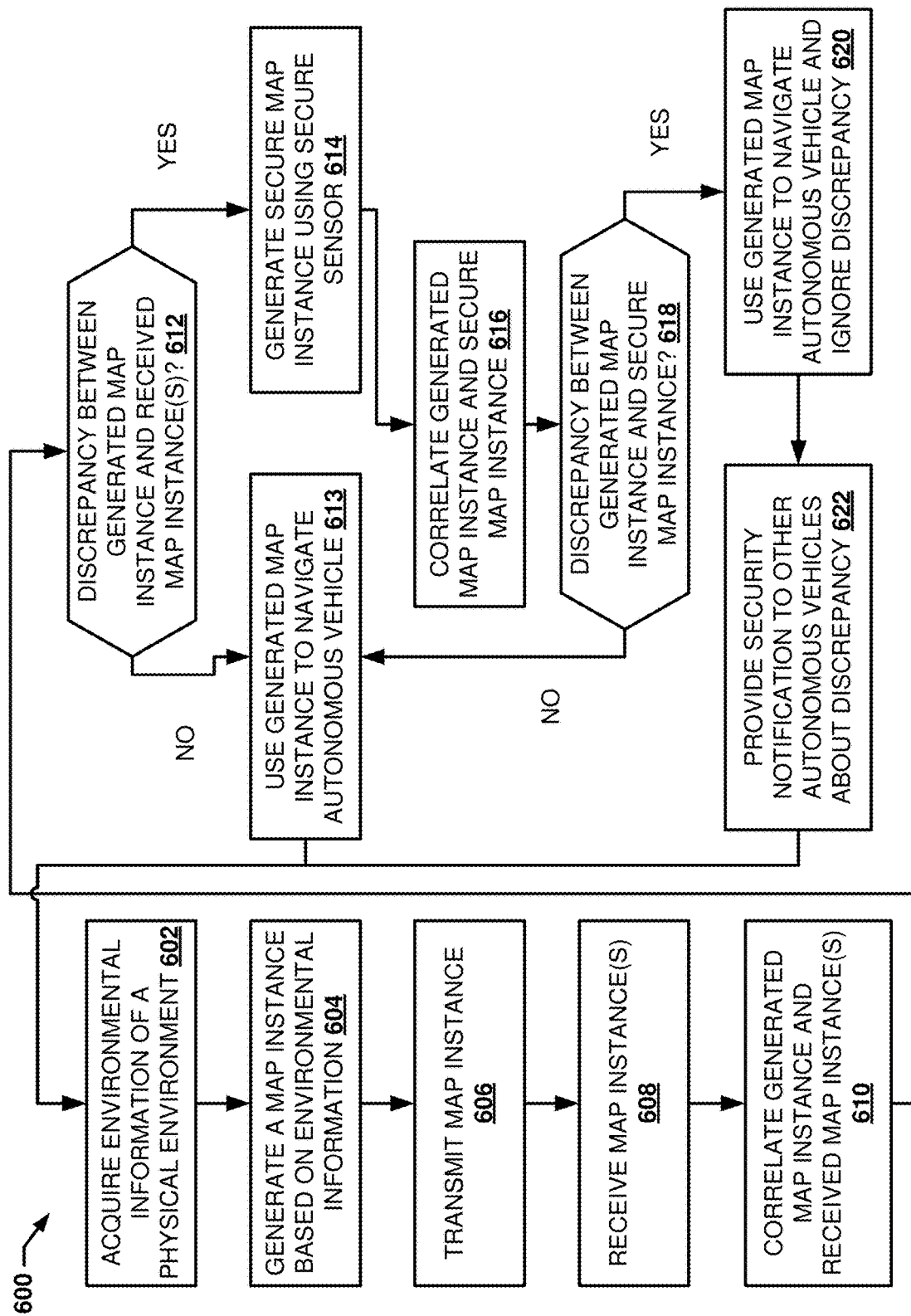
FIG. 6 is a flow chart illustrating an embodiment of a method of autonomous vehicle sensor security.

Referring now to FIG. 6, an embodiment of a method 600 of autonomous vehicle sensor security is illustrated. The method 600 will be discussed in reference to the Figs. above and FIG. 7 that illustrates an example scenario of the autonomous vehicle sensor security system 100 of FIG. 1. The method 600 begins at block 602 where an autonomous vehicle acquires environmental information of a physical environment. In an embodiment of block 602, the autonomous vehicle controller 204 may acquire environmental information about the physical environment 104 from the sensor system 236. The sensor system 236 may use one or more of sensors that generate sensor signals based on environmental inputs received at the sensors included in the imaging sensor system 302, the positioning system 304, the radar system 306, the lidar system 308, and/or the motion detector 310. The autonomous vehicle controller 204 may process those sensor signals to generate environmental information. As discussed above, environmental information may include a time stamp of when the sensor signal was received, geographical coordinates of fixed objects and roadside equipment units, approximate shape and dimension of moving and fixed objects with speed and direction, street geometry, road conditions, weather conditions, geographical coordinates of moving object with speed and directions of the moving object, position of the autonomous vehicle 200 in the physical environment 104, and/or other environmental information that would be apparent to one of skill in the art in possession of the present disclosure.

Figure 7:
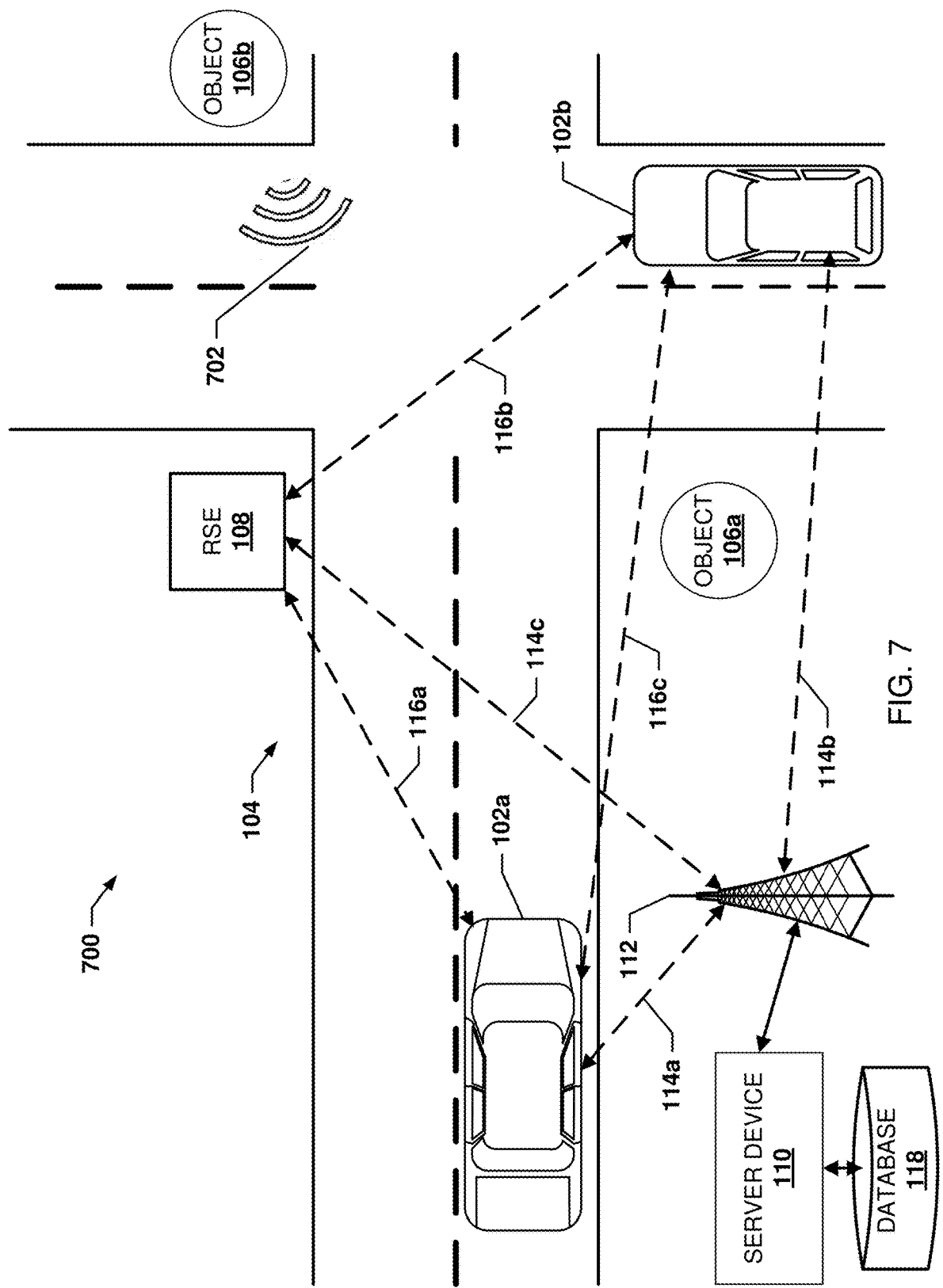
FIG. 7 is a schematic view illustrating an embodiment of an autonomous vehicle sensor security system of FIG. 1 during the method of FIG. 6.

In an example autonomous vehicle sensor security system 700 of FIG. 7, the autonomous vehicle 102a, the autonomous vehicle 102b, and/or the RSE unit 108 may generate environmental information about the physical environment 104. The physical environment 104 may include the object 106a and the object 106b. In this example, the object 106b may be a faux object that does not really exist in the physical environment 104 and is fictitiously provided to the physical environment 140 by an interfering signal 702 that may be malicious and provided by an attacker. In other examples, the interfering signal 702 may be caused by some sort of unintentional interfering signal within the physical environment 104. In the illustrated example, the interfering signal 702 may be directed at the autonomous vehicle 102a and may be sensed by the sensor system 236 of the autonomous vehicle 102a and not sensed by the sensor system 236 of the autonomous vehicle 102b and/or the sensor system 420 of the RSE unit 108. As such, the autonomous vehicle controller 204 of the autonomous vehicle 102a may generate environmental information that includes the object 106a and the object 106b as well as other objects in the physical environment 104 (e.g., the RSE unit 108 and the autonomous vehicle 102b). However, the autonomous vehicle controller 204 of the autonomous vehicle 102b and the RSE controller 404 of the RSE unit 108 may generate environmental information that includes the object 106a, information about the object 106a, and information of other objects in the physical environment 104 (e.g., the RSE unit 108 and the autonomous vehicle 102a, and/or the autonomous vehicle 102b) while not generating environmental information about object 106b.

The method 600 then proceeds to block 604 where a map instance is generated based on the environmental information. In an embodiment of block 604, the security module 326 of the autonomous vehicle controller 204 of the autonomous vehicle 200 may generate a map instance. The map instance may include, for example, a "lightweight" text file (for faster transmission and processing in real-time speed). The map instance may include some or all the environmental information (e.g., geographical coordinates of fixed objects and roadside equipment units, approximate shape and dimension of moving and fixed objects with speed and direction, street geometry, road conditions, weather conditions, geographical coordinates of moving objects with speed and directions of the moving objects and/or other environmental information that would be apparent to one of skill in the art in possession of the present disclosure) and may include a time stamp indicating when the map instance was generated. A map instance may be generated at a predetermined time interval. For example, the map instance may be generated every 2 secs., 1 sec., 0.5 sec., 0.25 sec., 0.2 sec., 0.1 sec. 0.05 sec., or any other interval that would be apparent to one of skill in the art in possession of the present disclosure. In various embodiments, the map instance file should be extremely light-weight files (e.g., ".txt" . . . etc.) for faster processing and low communication bandwidth requirements. There may be various file types but the autonomous vehicle sensor security system 100 and/or the participating autonomous vehicles 102a/102b and/or RSE units 108 should agree on which type is used. However, file converters may be included for interoperability.

Referring to the autonomous vehicle sensor security system 700 of FIG. 7, the autonomous vehicle 102a as well as the autonomous vehicle 102b and/or the RSE unit 108 may generate a respective map instance about the physical environment 104 at approximately the same time which is recorded in a respective time stamp for each map instance. The autonomous vehicle 102a may generate a map instance based on the environmental information that includes the object 106b and object 106a while the autonomous vehicle 102b and/or the RSE unit 108 may generate a map instance using the environmental information that includes the object 106a and not the object 106b.

The method 600 may then proceed to block 606 where the map instance is provided to at least one of the RSE unit and a second autonomous vehicle within the physical environment. In an embodiment of block 606, the autonomous vehicle 200 may provide via the communication system 206 (e.g., via the first communication interface 208 and/or the second communication interface 210), the map instance that is generated at block 604 to participating devices within the physical environment 104. For example and referring to FIG. 7, the security module 326 may provide the map instance via the communication system 206 to the RSE unit 108 and the autonomous vehicle 102b. Likewise, the RSE unit 108 and/or the autonomous vehicle 102b may provide, via their communication systems 412 and 206, respectively, the map instances generated by the security modules 408 and 326, respectively to each other and to the autonomous vehicle 102a.

In various embodiments the map instances are exchanged using a security protocol. For example, the autonomous vehicles 102a and/or 102b and the RSE unit may communicate the map instance via a two-way Transport Layer Security (TLS) protocol (e.g., Wireless Transport Layer Security (WTLS)) for authentication where the RSE unit 108 functions as a proxy Certificate Authorities to validate the autonomous vehicles 102a and/or 102b. For example, the authentication module 410 may be connected to the server device 110 that may provide a central Certificate Authority service (certificate authority services provided by DigiCert™ of Lehi, Utah, Symantec™ of Mountain View, Calif., etc.) on the service application module 504. The service application module 504 may provide TLS information from the autonomous vehicle sensor security database 118/508 to the RSE unit 108 such that the authentication module 410 may provide faster authentication checks, instead of the autonomous vehicles 102a and/or 102b sending a signal to the server device 110 itself. As such, the RSE unit 108 may function as a proxy/local Certificate Authority. Thus, when providing the map instance to the autonomous vehicles 102a and/or 102b and/or RSE units in the physical environment 104, each of the autonomous vehicles 102a and/or 102b and/or the RSE unit 108 may provide a public key assigned to that the autonomous vehicles 102a and/or 102b and/or the RSE unit 108 such that the public keys associated with map instances can be verified by the server device 110 and/or the RSE unit 108. As such, one of skill in the art will recognize that secure communications, such as a two-way TLS connection, are established between communicating entities (e.g., the autonomous vehicles 102a and/or 102b and/or the RSE unit 108) to exchange information to ensure authentication and encryption so the source of the information is vetted and not spoofed by hackers or the messages are manipulated to alter the information midway.

The method 600 then proceeds to block 608 where map instances are received by the autonomous vehicle from at least one of the RSE unit and other autonomous vehicles in the physical environment. In an embodiment of block 608 with reference to the example in FIG. 7, the autonomous vehicle 102a may receive a map instance from the RSE unit 108 and/or the autonomous vehicle 102b. In various embodiments, the autonomous vehicle 102a may verify the map instance(s) with the RSE unit 108 and/or the server device 110 to ensure that the map instance(s) are from an authenticated source. In various embodiments, the map instances received may include the environmental information that the autonomous vehicle 102b and/or the RSE unit 108 generated in block 604 and provided in block 606. As such, the environmental information in the map instances received may include object 106a and not object 106b. The autonomous vehicle 102a may receive the map instances via the communication system 206.

The method 600 may then proceed to block 610 where the map instance generated by the autonomous vehicle is correlated with one or more map instances received from at least one of the RSE unit or another autonomous vehicle. In an embodiment of block 610, the security module 326 of the autonomous vehicle controller 204 of the autonomous vehicle 200 may correlate the map instance received from other autonomous vehicles (e.g., autonomous vehicle 102b) and/or the RSE unit 108 in the physical environment 104 with the map instance the security module 326 generated. The map instance correlated may have the same or substantially the same time stamp (e.g., are within a predefined time threshold of each other). For example, the security module 326 may compare the environmental information between the generated map instance and the one or more received map instances to determine whether any discrepancies exist between the map instances. For example, the security module 326 may compare the locations of objects within the physical environment 104, the direction and speed of objects within the physical environment 104, which objects are within the physical environment 104, weather and/or road conditions of the physical environment 104 and/or any other environmental information that would be apparent to one of skill in the art in possession of the present disclosure. Referring to the autonomous vehicle sensor security system 700 of FIG. 7, the autonomous vehicle 102a may compare the map instance it generated to map instances received from the RSE unit 108 and/or the autonomous vehicle 102b.

The method 600 may then proceed to decision block 612 where it is determined whether any discrepancies exist between the generated map instance and the received map instance. In an embodiment of decision block 612, the security module 326 of the autonomous vehicle 200 may determine whether a discrepancy exists between the received map instances and the generated map instance of the physical environment 104. In various embodiments, a discrepancy exits when any of the environmental information provided in the compared map instances indicates a different physical environment 104.

For example and referring to the autonomous vehicle sensor security system 700 of FIG. 7, because the map instance generated by the autonomous vehicle 102a includes the object 106b and the map instance generated by the autonomous vehicle 102b and/or the map instance generated by the RSE unit 108 does not include the object 106b, the security module 326 of the autonomous vehicle 102a, the autonomous vehicle 102b and/or the RSE unit 108 may determine a discrepancy exists. In other embodiments, the security module 326 may additionally determine whether the differences between the map instance would affect planning of the autonomous vehicle. For example, there may exist a difference in object 106a between the map instance generated and the map instance received. In one map instance the object 106a may be stationary while in the other map instance the object 106a may be moving at a direction away from the road. Because neither situation will affect the controls of the autonomous vehicle 102a, the difference may not be determined to be a discrepancy.

In other embodiments, such a scenario may be determined to be a discrepancy but if another map instance confirms one or the other, the difference between the map instances may not be considered by the security module 326 as a discrepancy. In other embodiments, a predetermined threshold of differences may be required before a discrepancy is determined (e.g., a 1% difference, a 2% difference, a 5% difference, a 10% difference, a 25% difference, a 50% difference, and/or any other predetermine threshold). In various embodiments, a discrepancy may be determined based on the severity of damage that a mistake in processing the environmental information may cause. For example, if the size of the object 106b advertised by the interfering signal 702 is the size of a deer, the difference in the map instances may result in the security module 326 and/or 408 indicating a discrepancy while if the size of the object 106a advertised by the interfering signal 702 is the size of a small bird, the difference in the map instances may not be considered by the security module 326 and/or 408 as a discrepancy. If no discrepancy exists, the method 600 may proceed to block 613 where the autonomous vehicle 200 provides the map instance to the autonomous vehicle planning module 324 to use the environmental information to navigate the autonomous vehicle 200 by providing instructions to the autonomous vehicle system control unit 322 that controls instructions to the ECUs 216 that control the drive system 238 and the method 600 may proceed back to block 602.

If at block 612 a discrepancy does exist, the method 600 may proceed to block 614 where a secure sensor captures environmental information about the physical environment. In an embodiment of block 614, the security module 326, in response to determining a discrepancy in map instances exists, activates a secure sensor 312, which captures environmental inputs from the physical environment 104. The secure sensor 312 may be powered off and only powered on when a discrepancy is detected to limit the environmental inputs from the interfering signal 702. In other embodiments, the secure sensor 312 may be a different type of sensor than the sensor that captured the environmental inputs that were used to generate the map instance. For example, the map instance may have used environmental information from the radar system 306 and/or the lidar system 308 and the secure sensor 312 may include an imaging sensor such as a camera. In other embodiments, the secure sensor 312 may be directional such that the secure sensor 312 may be directed at an apparent location of the object and/or the condition identified as discrepant. In an embodiment, a secure map instance may be generated by the security module 326 from the environmental information obtained by the secure sensor 312. In some examples the activation of the secure sensor 312 should be less than 0.1 seconds and the processing of the sensor signal to generate a map instance and to correlate the map instance to confirm or deny the discrepancy, discussed below, may be less than 0.25 seconds; however, other times may be contemplated by one of skill in the art in possession of the present disclosure.

Referring to the example autonomous vehicle sensor security system 700 of FIG. 7, the autonomous vehicle 102a may activate a secure sensor 312 to verify the object 106b that has been determined to be a discrepancy in the map instance. The security module 326 may cause the secure sensor 312 to capture environmental inputs and generate sensor signals from which environmental information can be derived by the autonomous vehicle controller 204. The security module 326 may generate the secure map instance from the environmental information. Because the secure sensor 312 may not be exposed to the interfering signal 702 long enough to be affected by the interfering signal 702 and/or because the secure sensor 312 is a different type of sensor than the sensor that captured the interfering signal 702 and included it in the original map instance, the environmental information provided in the secure map instance does not include the object 106b.

The method 600 may then proceed to block 616 where the map instance generated by the autonomous vehicle is correlated with the secure map instance. In an embodiment of block 616, the security module 326 of the autonomous vehicle controller 204 of the autonomous vehicle 200 may correlate the secure map instance with the map instance the security module 326 found to include a discrepancy. The secure map instance may have a different time stamp than the map instance that included the discrepancy. However, the autonomous vehicle controller 204 may adjust the map instance that included the discrepancy for the time of the secure map instance. For example, if an object in the map instance that included the discrepancy is moving with a velocity, based on the speed and direction of the object, the autonomous vehicle controller 204 may calculate the anticipated location for that object at the time the secure map instance is generated. In another example, the acceleration of that object may be tracked as well from which the autonomous vehicle controller 204 may calculate the anticipated velocity at the time the secure map instance is generated. Adjusting the map instance to the time of the secure map instance results in an adjusted map instance. However, in other embodiments, the sensor system 300 may use the sensor that resulted in the discrepancy to capture environmental inputs at the same time as the secure sensors 312 such that the map instance generated by the sensor that resulted in the discrepancy has the same time stamp as the secure map instance. Such adjusted map instance may be created when correlating the generated map instance with the received map instance in block 610 of method 600 as well.

The security module 326 may correlate the map instance (e.g., adjusted map instance or new map instance) to the secure map instance. For example, the security module 326 may compare the environmental information between the map instance and the secure map instance to determine whether any discrepancies exist between the map instances. For example, the security module 326 may compare the locations of objects within the physical environment 104, the direction and speed of objects within the physical environment 104, which objects are within the physical environment 104, weather and/or road conditions of the physical environment 104 and/or any other environmental information that would be apparent to one of skill in the art in possession of the present disclosure. Referring to the example autonomous vehicle sensor security system 700 of FIG. 7, the autonomous vehicle 102a may compare the map instance that includes object 106b to the secure map instance that does not include object 106b.

The method 600 may then proceed to decision block 618 where it is determined whether any discrepancies exist between the map instance that included the discrepancy and the secure map instance. In an embodiment of decision block 618, the security module 326 of the autonomous vehicle 200 may determine whether a discrepancy exists between, for example, the adjusted map instance and the secure map instance of the physical environment 104. In various embodiments, a discrepancy exits when any of the environmental information provided in the compared map instances indicates a different physical environment 104 and/or by any of the methods described above used to determine that the original generated map instance had a discrepancy. In other embodiments, a predetermined threshold of differences may be required before a discrepancy is determined (e.g., a 1% difference, a 2% difference, a 5% difference, a 10% difference, a 25% difference, a 50% difference, and/or any other predetermine threshold). Referring to the example autonomous vehicle sensor security system 700 of FIG. 7, because the map instance generated by the autonomous vehicle 102a includes the object 106b and the secure map instance does not include the object 106b, the security module 326 of the autonomous vehicle 102 may determine a discrepancy exists. By validating the environmental information received using map instances, the autonomous vehicle 200 may provide an "air gap" between the autonomous vehicle 200 and the physical environment 104. Furthermore, other "air gaps" may exist between the communication system that exchanges the map instances between the autonomous vehicles 102a and/or 102b and/or the RSE unit 108 and the communication system that communicates over the network 112 to the Internet.

If no discrepancy exists between the map instance and the secure map instance at decision block 618, the method 600 may proceed to block 613 where the security module 326 provides the original map instance that included the discrepancy to the autonomous vehicle planning module 324 to use the environmental information to navigate the autonomous vehicle by providing instructions to the autonomous vehicle system control unit 322 that controls instructions to the ECUs 216 to control the components of the drive system 238 and the method 600 may proceed back to block 602.

If at decision block 618 a discrepancy exists between the map instance and the secure map instance, the method 600 may proceed to block 620 where the security module 326 provides the original map instance that included the discrepancy determined in block 612 to the autonomous vehicle planning module 324 with instructions to ignore the environmental information that is determined to be a discrepancy and to use the remaining environmental information to navigate the autonomous vehicle 200 by providing instructions to the autonomous vehicle system control unit 322 that controls instructions to the ECUs 216 that in turn controls the various components of the drive system 238. In other examples, the security module 326 provides the secure map instance or the portion of the secure map instance that provides the correct environmental information to the autonomous vehicle planning module 324 by providing the environmental information to the autonomous vehicle system control unit 322 that controls instructions to the ECUs 216 that in turn controls the various components of the drive system 238.

Referring to the example autonomous vehicle sensor security system 700 of FIG. 7, the autonomous vehicle 102a may determine, based on the secure map instance and the map instance that was identified to include a discrepancy, that the discrepancy (e.g., object 106b existing or not existing) between the map instance generated by the autonomous vehicle 102a and the at least one map instance received by the autonomous vehicle 102b and/or the RSE unit 108 is actually a discrepancy and that the object 106b does not exist. Thus, the autonomous vehicle 102a may navigate the physical environment 104 according to environmental information that does not include the object 106b that was determined to be a result of the interfering signal 702.

The method 600 may then proceed to block 622 where a security notification is broadcasted to the other authorized devices in the physical environment indicating that a discrepancy has been identified and confirmed in the physical environment. In an embodiment of block 622, the security module 326 may generate security notification that indicates that a discrepancy has been detected and confirmed using the secure sensor. The security module 326 may provide the security notification via the communication system 206 to RSE unit 108 and/or another autonomous vehicle in the physical environment 104. The security notification may include discrepancy information of a discrepant object and/or discrepant condition within the physical environment 104 such as a location, a direction, a speed, an approximate size and shape, conditions, and/or any other information that would be apparent to one of skill in the art in possession of the present disclosure. The security notification may cause the other autonomous vehicles to be aware of the discrepancy and cause the other autonomous vehicles to generate a secure map instance in the event the other autonomous vehicle detects the discrepancy. The method 600 may then proceed back to block 602.

Thus, systems and methods of the present disclosure provide for autonomous vehicle sensor security. By sharing map instances that include environmental information about a physical environment that autonomous vehicles are traversing, an autonomous vehicle within the physical environment may detect a discrepancy between map instances that may indicate a malicious and/or interfering signal. The autonomous vehicle may deploy a secure sensor that is unaffected or minimally affected by the malicious and/or interfering signal to verify or deny the discrepancy. If the discrepancy is verified as a discrepancy, that environmental information may be ignored or supplemented with correct environmental information which is used to navigate the autonomous vehicle. If the discrepancy is denied, the environmental information in the original map instance may be used to navigate the autonomous vehicle. The systems and methods of the present disclosure improve autonomous vehicle security and safety by making it more difficult to spoof an object or manipulate data of an existing object within a physical environment that may cause an undesirable action/maneuver by the autonomous vehicle.

Figure 8:
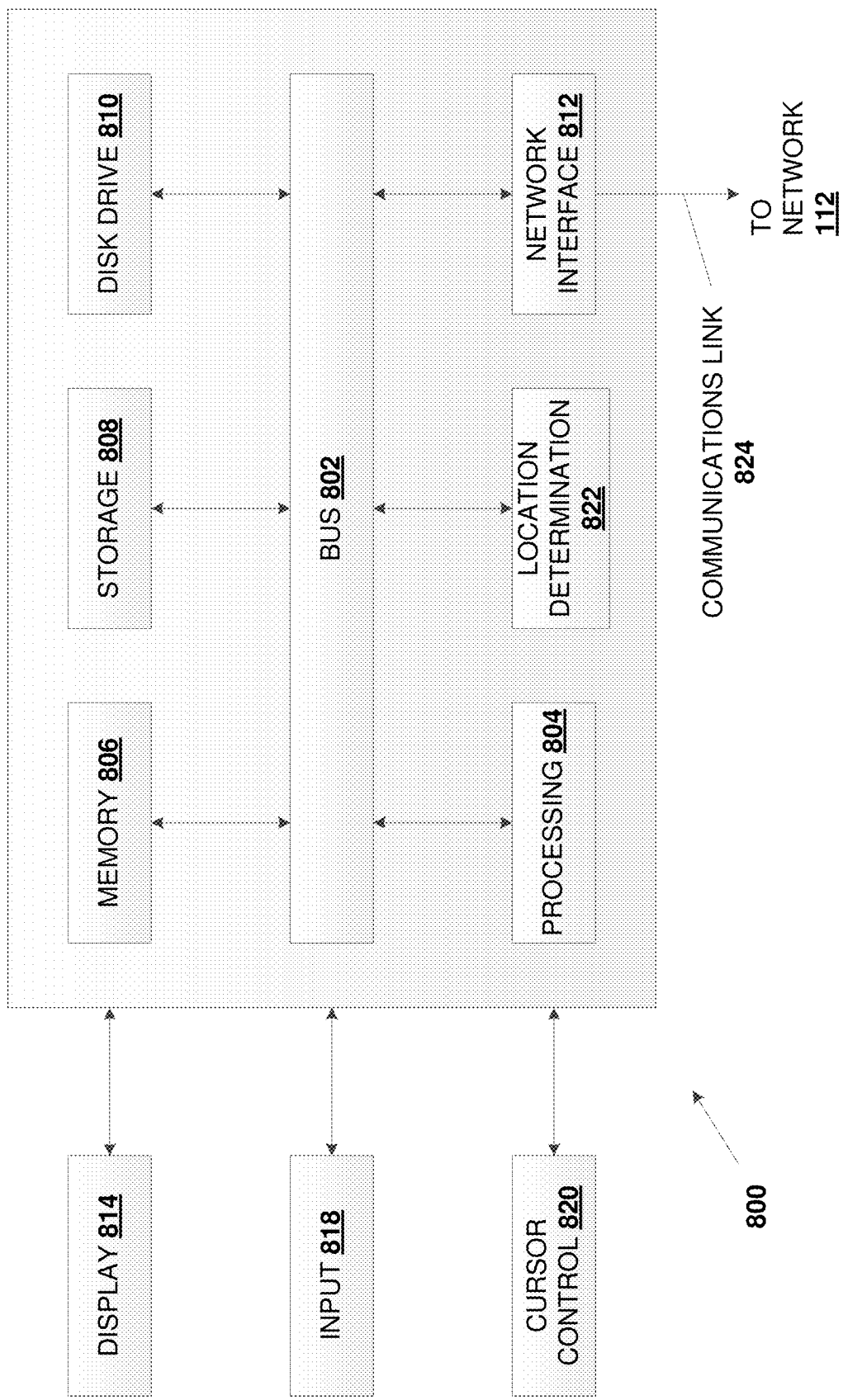
FIG. 8 is a schematic view illustrating an embodiment of a computer system.

Referring now to FIG. 8, an embodiment of a computer system 800 suitable for implementing, for example, the RSE unit 108 and 400 and the server devices 110 and 500 and implementing in the autonomous vehicles 102a, 102b, and 200 is illustrated. It should be appreciated that other devices utilized in the autonomous vehicle sensor security system 100 discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices.) In one implementation, the disk drive component 810 may comprise a database having one or more disk drive components.

In accordance with embodiments of the present disclosure, the computer system 800 performs specific operations by the processing component 804 executing one or more sequences of instructions contained in the system memory component 806, such as described herein with respect to the drone(s), the drone docking station(s), the service platform, and/or the remote monitor(s). Such instructions may be read into the system memory component 806 from another computer-readable medium, such as the static storage component 808 or the disk drive component 810. In other embodiments, hardwired circuitry may be used in place of or in combination with software instructions to implement the present disclosure.

Logic may be encoded in a computer-readable medium, which may refer to any medium that participates in providing instructions to the processing component 804 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 810, volatile media includes dynamic memory, such as the system memory component 806, and tangible media employed incident to a transmission includes coaxial cables, copper wire, and fiber optics, including wires that comprise the bus 802 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 112 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (e.g., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
comparing, by a first autonomous vehicle, first environmental information, representative of a physical environment and generated by a first sensor of the first autonomous vehicle, to second environmental information representative of the physical environment and generated by a second sensor of a second autonomous vehicle, wherein the second environmental information is concurrently generated with generation of the first environmental information; and
in response to determining, based on the comparing, that the first environmental information comprises a discrepancy with respect to the physical environment that is not represented in the second environmental information, activating, by the first autonomous vehicle, a secure sensor of the first autonomous vehicle to generate third environmental information representative of the physical environment to determine whether the discrepancy accurately describes the physical environment for navigating the first autonomous vehicle.

2. The method of claim 1, further comprising, in response to determining that the third environmental information indicates that the discrepancy accurately describes the physical environment, using, by the first autonomous vehicle, the first environmental information comprising the discrepancy to navigate the first autonomous vehicle.

3. The method of claim 1, further comprising, in response to determining that the third environmental information indicates that the discrepancy does not accurately describe the physical environment, using, by the first autonomous vehicle, the first environmental information, as modified to exclude the discrepancy, to navigate the first autonomous vehicle.

4. The method of claim 1, further comprising, in response to determining that the third environmental information indicates that the discrepancy does not accurately describe the physical environment, using, by the first autonomous vehicle, the third environmental information to navigate the first autonomous vehicle.

5. The method of claim 1, further comprising, in response to determining that the third environmental information indicates that the discrepancy accurately describes the physical environment, sending, by the first autonomous vehicle to the second autonomous vehicle, a security notification identifying the discrepancy.

6. The method of claim 1, wherein the secure sensor is a different type of sensor than the first sensor.

7. The method of claim 1, wherein the secure sensor is not yet active when the first environmental information is generated by the first sensor.

8. A first autonomous vehicle, comprising:
a processor; and
a memory that stores executable instructions that, when executed by the processor, facilitate performance of operations, comprising:
comparing first environmental information, comprising a first representation of a physical environment generated by a first sensor of the first autonomous vehicle, to second environmental information comprising a second representation of the physical environment generated by a second sensor of a second autonomous vehicle, wherein the first sensor generates the first representation concurrently with generation of the second representation by the second sensor; and
in response to determining, based on the comparing, that the first representation indicates that an object is in the physical environment that is not represented in the second representation, activating a secure sensor of the first autonomous vehicle to generate third environmental information comprising a third representation of the physical environment to determine whether the object exists in the physical environment and whether the object is to be considered for navigation of the first autonomous vehicle.

9. The first autonomous vehicle of claim 8, wherein the operations further comprise, in response to determining that the third representation indicates that the object exists in the physical environment, using the first environmental information for navigation of the first autonomous vehicle.

10. The first autonomous vehicle of claim 8, wherein the operations further comprise, in response to determining that the third representation indicates that the object does not exist in the physical environment, modifying the first environmental information to discard the object from the first representation, resulting in updated first environmental information, and using the updated first environmental information for navigation of the first autonomous vehicle.

11. The first autonomous vehicle of claim 8, wherein the operations further comprise, in response to determining that the third representation indicates that the object does not exist in the physical environment, using the third environmental information for navigation of the first autonomous vehicle.

12. The first autonomous vehicle of claim 8, wherein the operations further comprise, in response to determining that the third environmental information indicates that the object exists in the physical environment, generating a security notification identifying the object to provide to the second autonomous vehicle.

13. The first autonomous vehicle of claim 8, wherein the secure sensor is a different type of sensor than the first sensor.

14. The first autonomous vehicle of claim 8, wherein the secure sensor is inactive when the first environmental information is generated by the first sensor.

15. A non-transitory machine-readable medium, comprising executable instructions that, when executed by a processor of an autonomous vehicle, facilitate performance of operations, comprising:
comparing first environmental information, indicative of a physical environment generated by a first sensor of the autonomous vehicle, to second environmental information indicative of the physical environment generated by a second sensor of roadside equipment, the first environmental information having been generated by the first sensor concurrently with the second environmental information having been generated by the second sensor; and
in response to determining, based on a result of the comparing, that the first environmental information describes at least a portion of the physical environment differently than the second environmental information, activating a secure sensor of the autonomous vehicle to generate third environmental information of the physical environment to determine whether at least the portion of the physical environment is accurately described by the first environmental information for navigation of the first autonomous vehicle.

16. The non-transitory machine-readable medium of claim 15, wherein the operations further comprise, in response to determining that the third environmental information indicates that at least the portion of the physical environment is accurately described by the first environmental information, using the first environmental information to navigate the autonomous vehicle.

17. The non-transitory machine-readable medium of claim 15, wherein the operations further comprise, in response to determining that the third environmental information indicates that at least the portion of the physical environment is not accurately described by the first environmental information, using the first environmental information while ignoring at least the portion of the physical environment to navigate the autonomous vehicle.

18. The non-transitory machine-readable medium of claim 15, wherein the operations further comprise, in response to determining that the third environmental information indicates that at least the portion of the physical environment is not accurately described in the first environmental information, using the third environmental information to navigate the autonomous vehicle.

19. The non-transitory machine-readable medium of claim 15, wherein the operations further comprise, in response to determining that the third environmental information indicates that the portion of the physical environment is accurately described in the first environmental information, providing a security notification identifying at least the portion of the physical environment to the roadside equipment.

20. The non-transitory machine-readable medium of claim 15, wherein the secure sensor is a different type of sensor than the first sensor.

* * * * *